United States Patent
Lin et al.

(10) Patent No.: US 12,443,262 B2
(45) Date of Patent: Oct. 14, 2025

(54) ADAPTIVE LOADING-AWARE SYSTEM MANAGEMENT FOR BALANCING POWER AND PERFORMANCE

(71) Applicant: MediaTek Inc., Hsinchu (TW)

(72) Inventors: Chien-Nan Lin, Hsinchu (TW); You-Ming Tsao, Hsinchu (TW); Yung-Hsin Chu, Hsinchu (TW); An-Li Wang, Hsinchu (TW); Yu-Ting Kuo, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 18/547,130

(22) PCT Filed: Feb. 10, 2023

(86) PCT No.: PCT/CN2023/075409
§ 371 (c)(1),
(2) Date: Aug. 18, 2023

(87) PCT Pub. No.: WO2023/151644
PCT Pub. Date: Aug. 17, 2023

(65) Prior Publication Data
US 2024/0385674 A1    Nov. 21, 2024

Related U.S. Application Data

(60) Provisional application No. 63/381,767, filed on Nov. 1, 2022, provisional application No. 63/308,509, filed on Feb. 10, 2022.

(51) Int. Cl.
*G06F 1/00* (2006.01)
*A63F 13/77* (2014.01)
*G06F 1/324* (2019.01)

(52) U.S. Cl.
CPC .............. *G06F 1/324* (2013.01); *A63F 13/77* (2014.09); *A63F 2300/538* (2013.01)

(58) Field of Classification Search
CPC ...... G06F 1/324; G06F 1/3212; G06F 1/3218; G06F 1/3265; A63F 13/77; A63F 2300/538; A63F 13/358; A63F 13/52; Y02D 10/00
See application file for complete search history.

(56) References Cited

U.S. PATENT DOCUMENTS

| 10,523,947 B2 * | 12/2019 | Amer ................... H04N 19/115 |
| 2008/0189562 A1 * | 8/2008 | McBrearty ............ G06F 1/3203 713/300 |

(Continued)

FOREIGN PATENT DOCUMENTS

CN          113368495 A      9/2021

OTHER PUBLICATIONS

PCT written opinion and international search report, PCT/CN2023/075409 mailed Apr. 23, 2023.

*Primary Examiner* — Xuxing Chen
(74) *Attorney, Agent, or Firm* — Tong J. Lee

(57) ABSTRACT

A computing system performs balanced power management based on requirements of graphics scenes in a video game. Based on the requirements of the graphics scenes, the system selects one or more performance metrics to reduce in real-time, where the performance metrics are indicators of video game quality. The system compares estimated power consumption with a power budget after reducing the one or more performance metrics. Based on the requirements of the graphics scenes, the system further selects one or more quality enhancers to activate in real-time while keeping the estimated power consumption within the power budget. Each quality enhancer enhances the video game with respect (Continued)

to a performance metric. The system then displays the video game enhanced by the one or more quality enhancers.

18 Claims, 7 Drawing Sheets

(56) References Cited

U.S. PATENT DOCUMENTS

| | | | |
|---|---|---|---|
| 2013/0176322 A1* | 7/2013 | Bakalash | G06F 1/3212 |
| | | | 345/522 |
| 2019/0088193 A1* | 3/2019 | Tada | G06F 3/04845 |
| 2019/0286214 A1* | 9/2019 | Pabalkar | G06F 1/3228 |
| 2019/0308099 A1* | 10/2019 | Lalonde | A63F 13/355 |
| 2021/0287631 A1* | 9/2021 | Yang | G06F 1/3265 |
| 2023/0205301 A1* | 6/2023 | Duenas | G06F 1/3234 |
| | | | 713/300 |

* cited by examiner

ADAPTIVE LOADING-AWARE SYSTEM MANAGEMENT FOR BALANCING POWER AND PERFORMANCE

CROSS-REFERENCE TO RELATED APPLICATIONS

This application claims the benefit of U.S. Provisional Application No. 63/308,509 filed on Feb. 10, 2022 and U.S. Provisional Application No. 63/381,767 filed on Nov. 1, 2022, the entirety of both of which is incorporated by reference herein.

TECHNICAL FIELD

Embodiments of the invention relate to a system that dynamically adjusts the computing load of each processor to manage power consumption while maintaining or optimizing the quality of a graphics scene in a video game.

BACKGROUND OF THE INVENTION

As modern mobile games increasingly emphasize high frame rates and high resolution, the demand for hardware processing capability has also greatly increased. In particular, the processing capability of a graphic processing unit (GPU) can directly affect a user's gaming experience. However, a user's device typically has limited cooling capacity, which imposes temperature restrictions on the device. The temperature restrictions can adversely affect the performance of each processor, resulting in a poor gaming experience.

Conventional computing systems allow a user to place a system into a power-saving mode or a high-performance mode. The power-saving mode extends the battery life at the expense of performance, while the high-performance mode increases the processor performance at the expense of energy consumption.

For video gaming, one of the performance indicators is the video game quality displayed on a gaming device. The video game may freeze when the device encounters performance bottlenecks, which can be caused by excessive load on the processors. Reducing excessive processor loading not only reduces the performance bottlenecks but also lowers system power consumption. However, under-utilization of the processors can cause unnecessary performance degradation. Thus, there is a need for balanced management of power and performance while minimizing negative impact on users' gaming experiences.

SUMMARY OF THE INVENTION

In one embodiment, a method is provided for balanced power management in a computing system. The method includes the steps of selecting, based on the requirements of the graphics scenes, one or more performance metrics to reduce in real-time, where the performance metrics are indicators of video game quality. The method further includes the steps of comparing estimated power consumption with a power budget after reducing the one or more performance metrics, and selecting, based on the requirements of the graphics scenes, one or more quality enhancers to activate in real-time while keeping the estimated power consumption within the power budget. Each quality enhancer enhances the video game with respect to a performance metric. The computing system then displays the video game enhanced by the one or more quality enhancers.

In another embodiment, a system is operative to perform balanced power management. The system includes multiple processors and a balance manager circuitry coupled to the processors. The balance manager circuitry is operative to select, based on requirements of graphics scenes in a video game, one or more performance metrics to reduce in real-time. The performance metrics are indicators of video game quality. The balance manager circuitry is further operative to compare estimated power consumption with a power budget after reduction of the one or more performance metrics, and select, based on the requirements of the graphics scenes, one or more quality enhancers to activate in real-time while keeping the estimated power consumption within the power budget. The quality enhancer enhances the video game with respect to a performance metric. The system further includes a display to display the video game enhanced by the one or more quality enhancers.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a balance manager in a multiprocessor computing system. The computing system renders a computer-generated video game including a sequence of graphics scenes, e.g., gaming scenes in a video game. The balance manager monitors the processor loading during the video game play and estimates real-time system power consumption. The balance manager may predict the power consumption based on predicated processor loading and thermal conditions of the system. The balance manager uses a dynamic quality control mechanism to control the output video game quality in real-time. In gaming scenarios with low power consumption, the balance manager may increase the frame rate, resolution, picture quality level, etc. to improve the user experience. In high power consumption or thermal-constrained scenarios, the power consumption bottlenecks can be relieved by reducing processor loading, such as reducing frame rate, resolution, picture quality level, etc. The balance manager may compensate for the reduced performance by activating one or more quality enhancers. The balance manager aims to optimize a user's overall gaming experience within the power budget.

The term "real-time" as used herein refers to the time when a video game is rendered and displayed; e.g., when a video game is being played by a user. The term "performance" herein encompasses video game attributes such as frame per second (FPS) and resolution, as well as picture quality such as smoothness of a gaming sequence, color, distortion, light, blurring, noise, etc., in a graphics scene. Performance metrics include measurements of these video game attributes and picture quality levels. Thus, performance metrics are indicators of an output video game quality.

Figure 1:
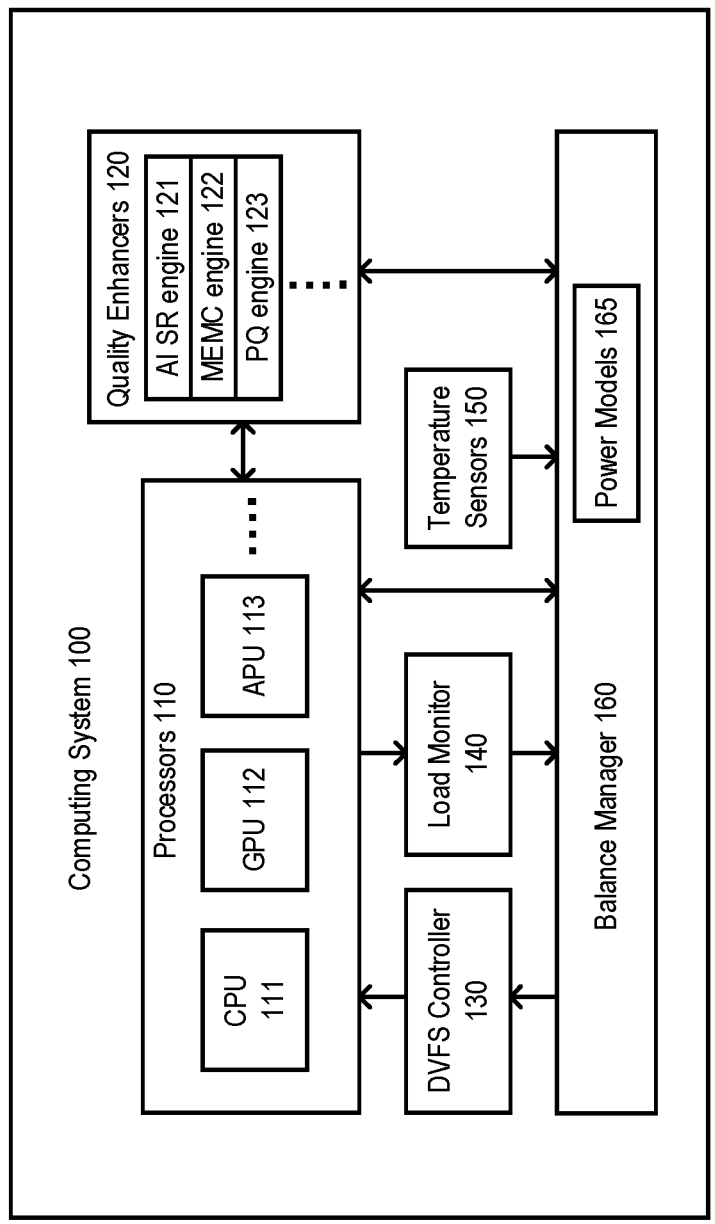
FIG. 1 is a diagram of a computing system according to one embodiment.

FIG. 1 illustrates an example of a computing system 100 according to one embodiment. In this example, the computing system 100 includes multiple processors 110 such as a central processing unit (CPU) 111, a graphics processing unit (GPU) 112, an artificial intelligence (AI) processing unit (APU) 113, and the like. CPU 111 may further include multiple cores. Processors 110 may render a video game including a sequence of graphics scenes such as gaming scenes. Computing system 100 also includes a dynamic voltage frequency scaling (DVFS) controller 130 to control the voltage and operating frequency of processors 110, a load monitor 140 to monitor the processor loading, and temperature sensors 150 to monitor the internal and ambient temperatures. Computing system 100 further includes a balance manager 160 to manage the system power consumption while taking into account the output video game quality. In one embodiment, balance manager 160 may estimate the power consumption based on the current processor loading from load monitor 140 and the expected computation load required by the graphics scenes. Balance manager 160 compares the estimated power consumption with a system power budget. The system power budget, also referred to as "power budget," may change over time when the system or processor temperatures change.

In one embodiment, when the estimated power consumption exceeds the power budget, balance manager 160 signals processors 110 to reduce loading. In one embodiment, processor loading may be reduced by reducing one or more of performance metrics including but not limited to resolution, FPS, picture quality level, etc. The one or more performance metrics may be selected based on the requirements of the graphics scenes; such as a requirement for 60 FPS or a requirement to prioritize FPS over resolution. The selection may be based on the present loading of each processor and its predicted loading after a selected performance metric is reduced; for example, lowering the resolution can reduce GPU loading and memory bandwidth, while lowering the FPS can reduce the loading of both CPU and GPU. Additionally, the selection may be based on the amount of power consumption over the power budget; e.g., FPS reduction may reduce more power consumption than resolution reduction. Balance manager 160 may further use DVFS controller 130 to reduce the operating frequency of processors 110.

In one embodiment, computing system 100 also includes quality enhancers 120 to enhance or fine-tune the video game quality output from or displayed on computing system 100. Non-limiting examples of quality enhancers 120 include an AI super-resolution (SR) engine 121, a motion estimation motion compensation (MEMC) engine 122, a picture quality (PQ) engine 123, etc. AI SR engine 121 may receive a video game with low resolution (e.g., 720×480 pixels) and perform SR operations to scale up the video game to a higher resolution (e.g., 3840×2160 pixels) for display. In an alternative embodiment, quality enhancers 120 may include an SR enhancer based on techniques not limited to AI. MEMC engine 122 performs frame interpolation to increase the FPS of a video game. PQ engine 123 improves picture quality. In one embodiment, PQ engine 123 includes multiple quality enhancers to perform variable-rate shading (VRS), ray-tracing, temporal anti-aliasing (TAA), and the like, each of which can be independently turned on and off.

Balance manager 160 may set a lower resolution of a computer-generated video game to reduce the GPU usage when the graphics scene does not require a high resolution. Lowering the resolution can reduce GPU loading and memory bandwidth. Balance manager 160 may then restore the resolution in real time (i.e., while the video game is running) by activating AI SR engine 121 and/or other enhancement means.

Alternatively, balance manager 160 may reduce the FPS of a computer-generated video game to reduce the loading of CPU and GPU. Balance manager 160 may then use MEMC engine 122 to perform frame interpolation to restore or further increase the FPS of the video game in real-time. In one embodiment, the operations of MEMC engine 122 may be performed by GPU, APU, or other processors.

If the power consumption needs to be further reduced after the reduction of resolution and FPS, balance manager 160 may reduce the shading rate. In one embodiment, instead of reducing the shading rate for the entire frame, PQ engine 123 performs variable-rate shading (VRS) in real-time by varying the shading rate for different regions of a frame. The use of VRS increases rendering performance and quality, and reduces power consumption when compared with a uniformly high shading rate.

Although quality enhancers 120 are shown as components separate from processors 110, in some embodiments the operations of quality enhancers 120 may be executed by processors 110. In alternative embodiments, one or more of the quality enhancers 120 may be implemented by special-purpose hardware, or software executed by general-purpose or special-purpose hardware.

The operations of quality enhancers 120 may increase the power consumption of computing system 100. However, it may be worthwhile to activate a quality enhancer 120 to compensate for a performance metric reduction, as long as the performance metric reduction saves more power than the power consumed by the quality enhancer 120.

In one embodiment, balance manager 160 may obtain or estimate real-time power consumption from hardware power meters, software algorithms, and/or power models, etc. In one embodiment, balance manager 160 may estimate the power consumption from processor loading statistics, number of instructions per second, bandwidth, temperature, etc. In one embodiment, balance manager 160 may calculate the system power budget from software configurations, thermal conditions, and other related information.

In one embodiment, balance manager 160 uses power models 165 to estimate the power consumption based on processor loading. Balance manager 160 may also use power models 165 to estimate the change in power consumption when one or more of the performance metrics change. Balance manager 160 may also use power models 165 to estimate the change in power consumption when one or more of quality enhancers are turned on or off. Power models 165 help balance manager 160 to determine whether the power consumption is below or above the power budget, and which quality enhancer(s) can be activated without exceeding the power budget.

Balance manager 160 determines whether to turn on or off a quality enhancer 120 based on a number of factors, including but not limited to: the current CPU and/or GPU frequency and usage, graphics scene complexity, and other indicators. Balance manager 160 may obtain the current power consumption of processors 110 and predict whether the power consumption would exceed the power budget after each quality enhancer 120 is turned on or off. Then balance manager 160 turns on or off a quality enhancer 120 based on the prediction.

The system power budget is reduced when computing system 100 enters a predetermined high temperature range. In response to the reduced power budget, balance manager 160 may further dynamically turn on or off each quality enhancer 120 in real-time. In one embodiment, computing system 100 may maintain a whitelist, indicating which functions of which graphics scene are to be activated and/or prioritized. According to the whitelist, each function for each game scene is provided with independent settings and parameter configurations. Balance manager 160 determines which quality enhancers 120 to turn on or off based on the whitelist.

Quality enhancers 120 and balance manager 160 may be implemented with hardware, software, firmware, or a combination of hardware and software. Similarly, AI SR engine 121, MEMC engine 122, and PQ engine 123 may be implemented with hardware, software, firmware, or a combination of hardware and software.

Figure 2:
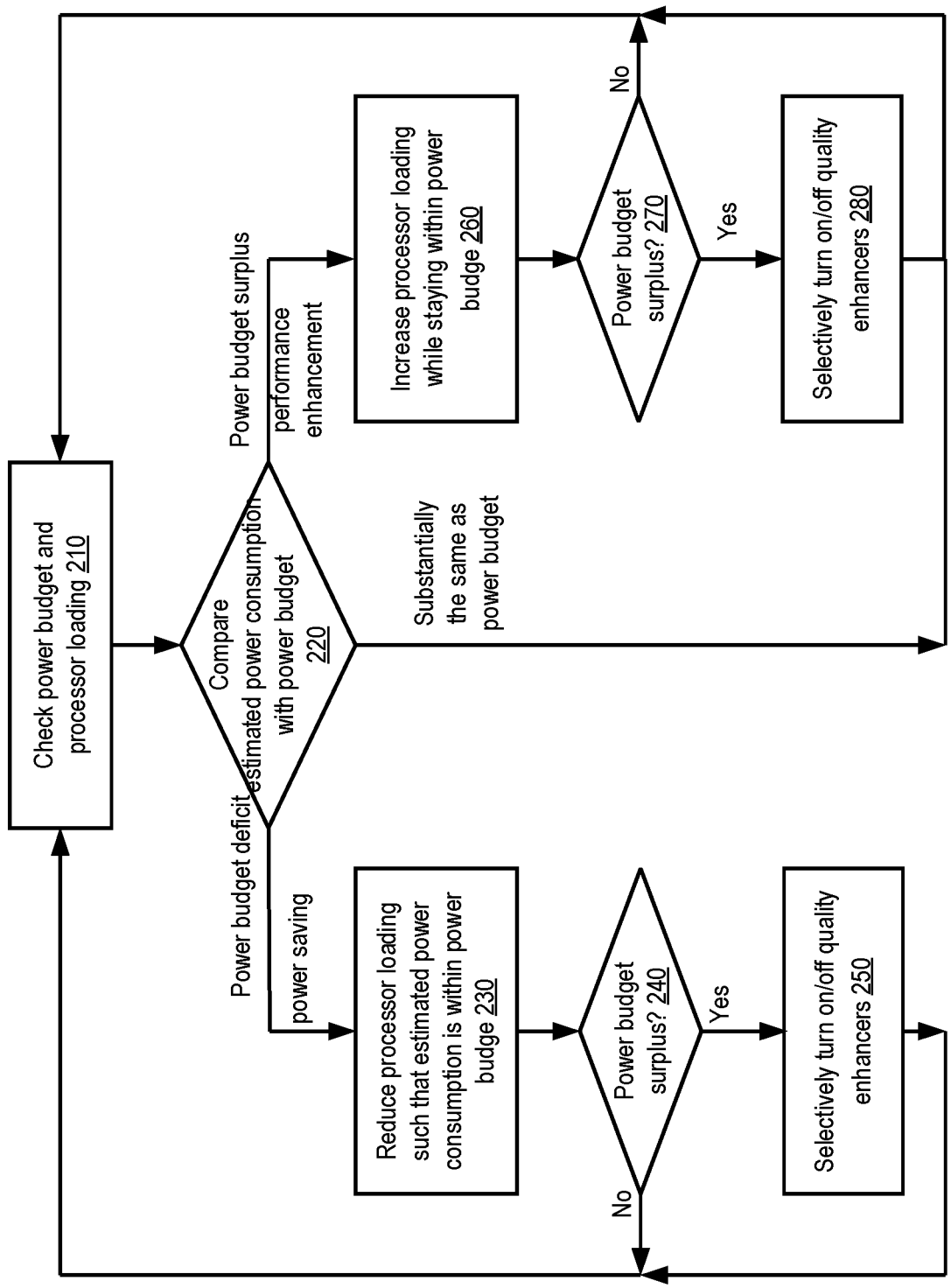
FIG. 2 is a flow diagram illustrating a process performed by a balance manager according to one embodiment.

FIG. 2 is a flow diagram illustrating a process performed by balance manager 160 according to one embodiment. Balance manager 160 checks the power budget and the processor loading at step 210, and compares the power budget with the estimated power consumption at step 220, where the power consumption may be estimated from processor loading. If the estimated power consumption exceeds the power budget (i.e., power budget deficit), computing system 100 enters a power saving mode in which processor loading is reduced at step 230 such that estimated power consumption is within the power budget. The processor loading may be reduced by reducing one or more performance metrics such as FPS, resolution, picture quality, etc. Balance manager 160 may select which performance metric(s) to reduce based on the requirements of the graphics scenes being rendered. Balance manager 160 may also determine which performance metric(s) to reduce based on the amount of power budget deficit, the estimated power saving by the selected performance metric, the loading of each processor and the estimated change in loading of each processor after the power metric reduction, the requirements of the whitelist, etc.

After the reduction of the performance metric(s), if the estimated power consumption is below the power budget (i.e., power budget surplus) at step 240, balance manager 160 may selectively turn on or off quality enhancers 120 at step 250. Balance manager 160 may determine which quality enhancers 120 to turn on or off based on the requirements of the graphics scenes being rendered. Balance manager 160 may determine which quality enhancers 120 to turn on or off based on the amount of power budget surplus, the estimated power consumed by the selected quality enhancer, the loading of each processor and the estimated change in loading of each processor caused by the selected quality enhancer, the requirements of the whitelist, etc.

For example, if a gaming scene prioritizes FPS over resolution, balance manager 160 may turn on MEMC engine 122 and turn off AI SR engine 121 (if AI SR was previously turned on). Balance manager 160 estimates the power consumption of the turning on/off of the selected quality enhancers to maintain the power consumption within the power budget. The process may return to step 210 after step 250, or if there is no or insufficient power budget surplus at step 240.

If at step 220 the estimated power consumption does not exceed the power budget, computing system 100 either enters a performance enhancement mode if there is a power budget surplus, or maintains the same processor loading if the estimated power consumption is substantially the same as the power budget. If the power budget surplus is sufficient to support an increase in processor loading, balance manager 160 may increase the processor loading at step 260 such that the estimated power consumption stays within the power budget. The processor loading may be increased by increasing one or more performance metrics such as FPS, resolution, picture quality, etc. Balance manager 160 may determine which performance metric(s) to increase based on the requirements of the graphics scenes being rendered. Balance manager 160 may also determine which performance metric(s) to increase based on the amount of power budget surplus, the estimated power increase caused by the selected performance metric, the loading of each processor and the estimated change in loading of each processor after the power metric increase, the requirements of the whitelist, etc.

After the increase of the performance metric(s), if there is further power budget surplus at step 270, balance manager 160 may selectively turn on or off quality enhancers 120 at step 280. Similar to step 250, balance manager 160 may determine which quality enhancers 120 to turn on or off based on factors similar to those at step 250. The process may return to step 210 after step 280, or if there is no or insufficient power budget surplus at step 220 or step 270.

Figure 3:
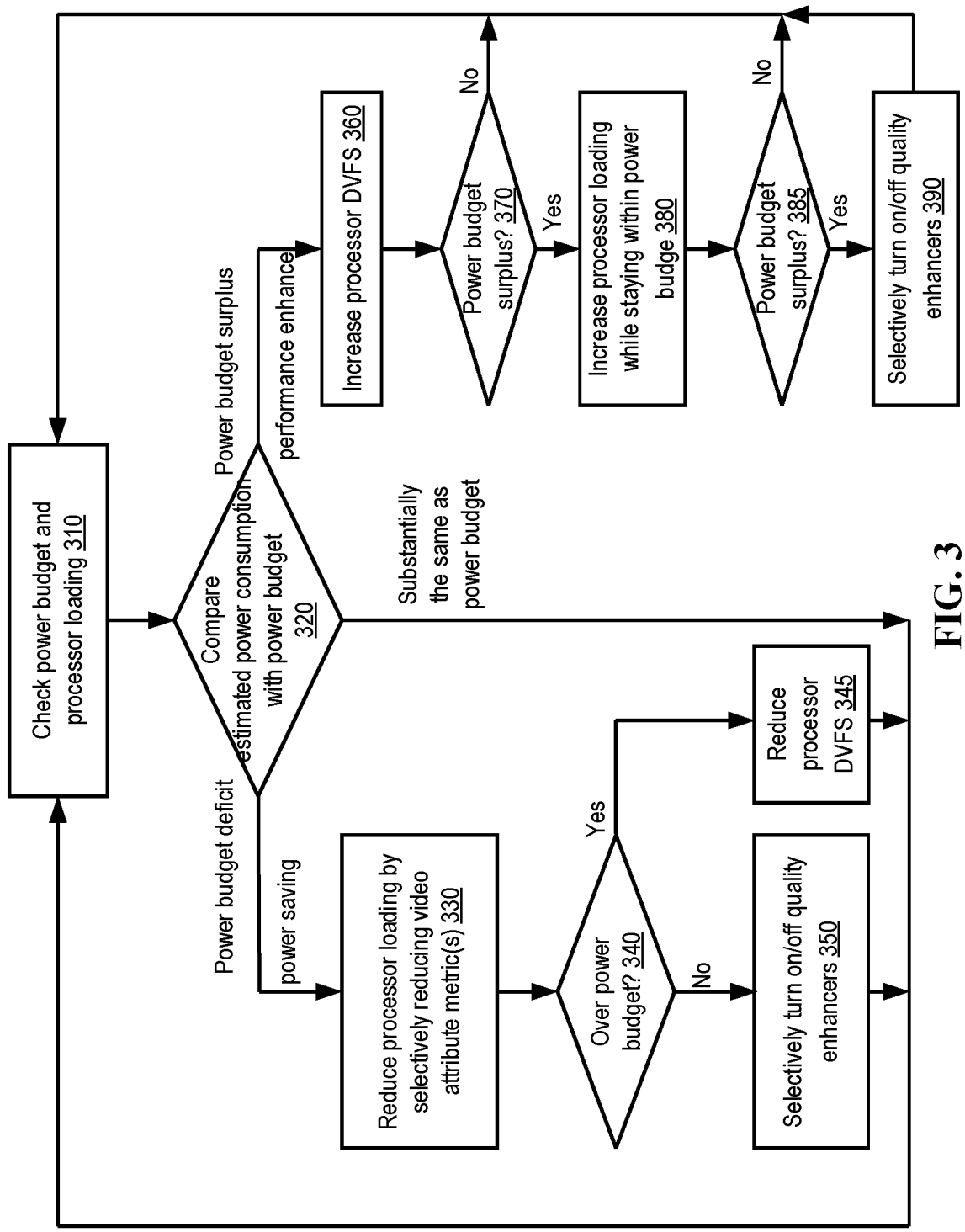
FIG. 3 is a flow diagram illustrating a process performed by a balance manager according to another embodiment.

FIG. 3 is a flow diagram illustrating a process performed by balance manager 160 according to another embodiment. Balance manager 160 checks the power budget and the processor loading at step 310, and compares the power budget with the estimated power consumption at step 320, where the power consumption may be estimated from the processor loading. If the estimated power consumption is substantially the same as the power budget, balance manager 160 may determine to maintain the same processor loading and the process returns to step 310. If the estimated power consumption exceeds the power budget, computing system 100 enters a power saving mode. Steps 330, 340, and 350 are the same as steps 230, 240, and 250 in FIG. 2, except at step 340 when there is no power budget surplus, balance manager 160 at step 345 may signal DVFS controller 130 (FIG. 1) to reduce the operating frequency of processors 110. The frequency reduction may be performed step by step until the estimated power consumption is within the power budget. The process may return to step 310 after step 350 or step 345.

If at step 320 the estimated power consumption is below the power budget, computing system 100 enters a performance enhancement mode. If the power budget surplus is sufficient to support an increase in the operating frequency of processors 110, balance manager 160 at step 360 may signal DVFS controller 130 (FIG. 1) to increase the operating frequency of processors 110 step-by-step without exceeding the power budget.

If at step 370 the power budget surplus is sufficient to further support an increased processor loading, balance manager 160 may increase the processor loading at step 380 without exceeding the power budget. Steps 380, 385, and 390 are the same as steps 260, 270, and 280 in FIG. 2. The process may return to step 310 after step 390 or if there is no or insufficient power budget surplus at step 370 or 385.

Figure 4:
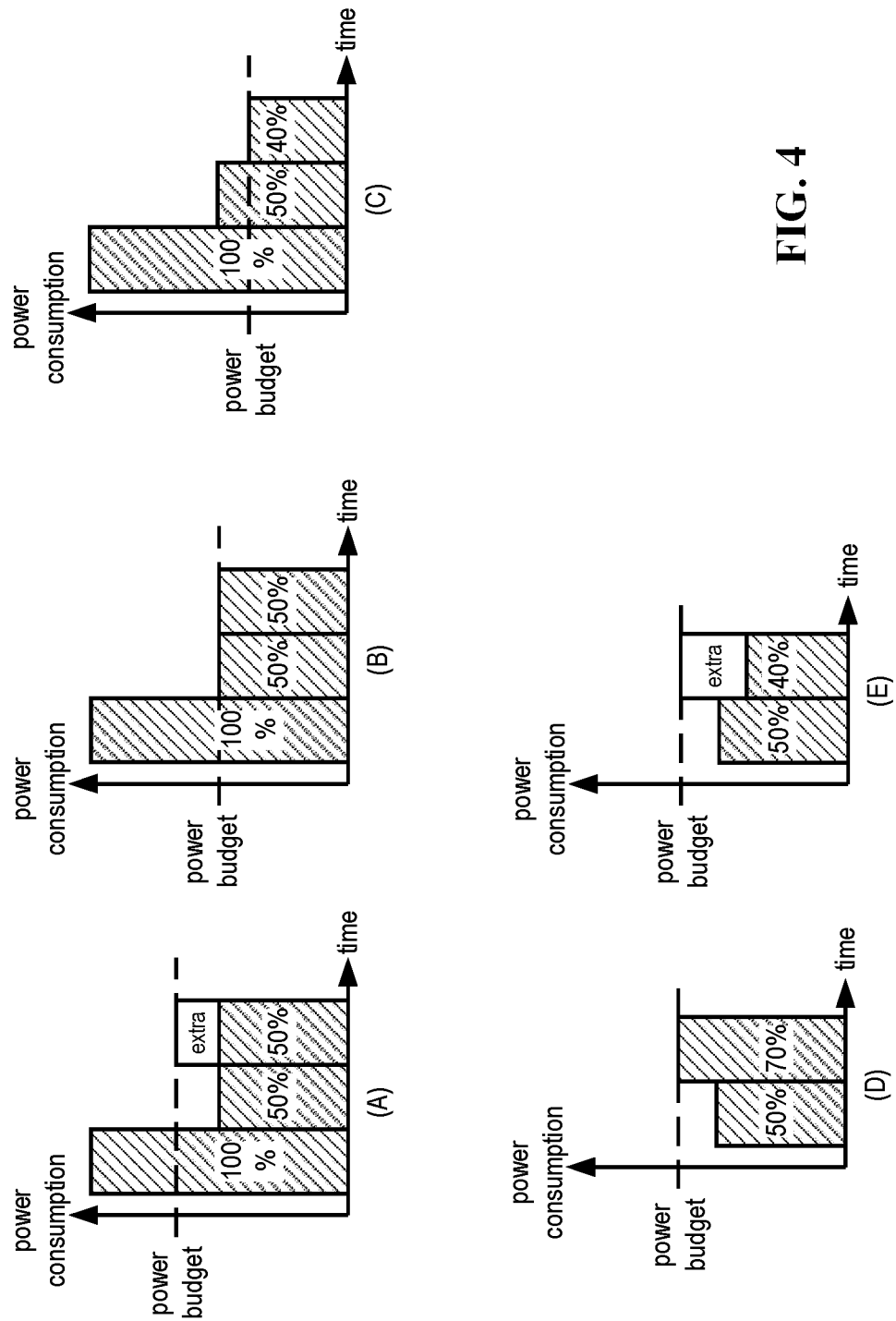
FIG. 4 is a diagram illustrating examples of adaptive processor loading under the control of a balance manager according to one embodiment.

FIG. 4 illustrates examples of adaptive processor loading under the control of balance manager 160 (FIG. 1) according to one embodiment. In diagrams (A)-(E), the vertical axis represents power consumption, which is estimated from processor loading indicated as the percentage in each vertical bar (e.g., 100%, 50%, 70%, etc.). The horizontal axis represents time, and the horizontal dashed line represents the power budget. Initially in (A) the power consumption exceeds the power budget. Balance manager 160 reduces one or more of the performance metrics to reduce the processor loading from 100% to 50%, thereby bringing down the power consumption to below the power budget. The power budget surplus (indicated as "extra") at this point is sufficient to support one or more quality enhancers 120 (FIG. 1), which can be activated (i.e., turned on) by balanced manager 160 to improve output video game quality.

In (B), the power budget is lower than that in (A). The system may lower the power budget when the system temperature increases. After balance manager 160 reduces one or more of the performance metrics to reduce the processor loading from 100% to 50%, the power consumption is substantially the same as the power budget. Thus, there is insufficient power budget surplus to support any quality enhancers 120 at this point.

In (C), the power budget is lower than that in (B), which may be caused by an even higher system temperature. After balance manager 160 reduces one or more of the performance metrics to reduce the processor loading from 100% to 50%, the power consumption still exceeds the power budget. Thus, balance manager 160 may activate additional video game/picture quality reduction measures and/or signal DVFS controller 130 (FIG. 1) to reduce the processor operating frequency to further bring down the power consumption.

In (D), the initial power consumption is lower than the power budget. Thus, balance manager 160 may increase the processor operating frequency, increase one or more performance metrics, and/or activate one or more quality enhancers 120 to utilize the surplus in the power budget. Alternatively in (E), balance manager 160 may choose to decrease one or more performance metrics and activate one or more quality enhancers 120. Scenarios where (A) and (E) may occur are provided in FIG. 5 and FIG. 6, respectively.

Figure 5:
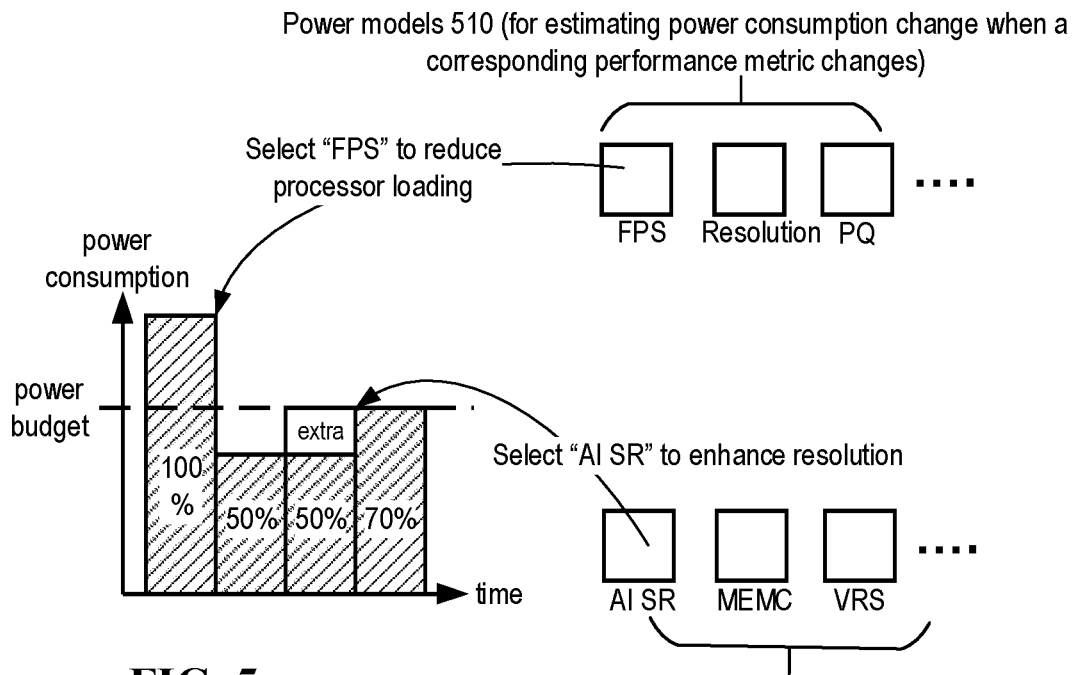
FIG. 5 is an example illustrating the operation of a balance manager according to one embodiment.

FIG. 5 is an example based on diagram (A) in FIG. 4 illustrating the operation of balance manager 160 (FIG. 1) according to one embodiment. Balance manager 160 has access to power models 510 for estimating the change in power consumption when corresponding performance metrics change. To reduce processor loading in real-time, balance manager 160 may select a combination of the performance metrics to reduce. The requirements of the graphics scenes may indicate that resolution is prioritized over FPS. Thus, FPS is chosen for reduction. Balance manager 160 may reduce additional performance metrics to further decrease the power consumption if necessary.

After the FPS reduction, there is extra power budget that can be utilized for video game quality enhancement. Even though MEMC corresponds to (i.e., compensates for) the reduced FPS, balance manager 160 may select another quality enhancer to turn on. Based on power models 520, the loading of each processor, and the graphics scene requirements, balance manager 160 may determine that MEMC would require more power than the power budget allows, and AI SR can be activated to further improve resolution. It is noted that balance manager 160 may select any quality enhancer to turn on, not limited to the quality enhancer corresponding to the reduced performance metric.

Figure 6:
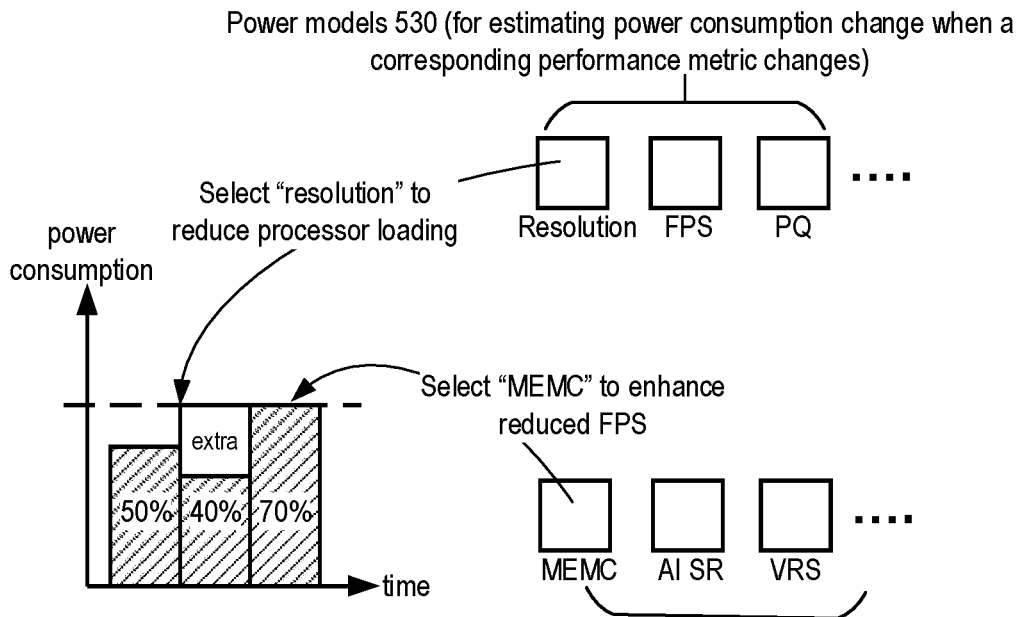
FIG. 6 is an example illustrating the operation of a balance manager according to another embodiment.

FIG. 6 is an example based on diagram (E) in FIG. 4 illustrating the operation of a balance manager according to one embodiment. Initially, the power consumption is below the power budget. However, taking into account the graphics scenes requirements that prioritize FPS over resolution, balance manager 160 may determine to reduce the resolution such that there is sufficient power budget surplus to support the MEMC quality enhancer to compensate for the previously-reduced FPS. Balance manager 160 may use power models 530 and 540 to predict the estimated change in power consumption in comparison with the power budget. FIG. 6 shows that the resolution reduction brings down the processor loading from 50% to 40%, and the activation of MEMC increases the processor loading from 40% to 70% without exceeding the power budget.

Figure 7:
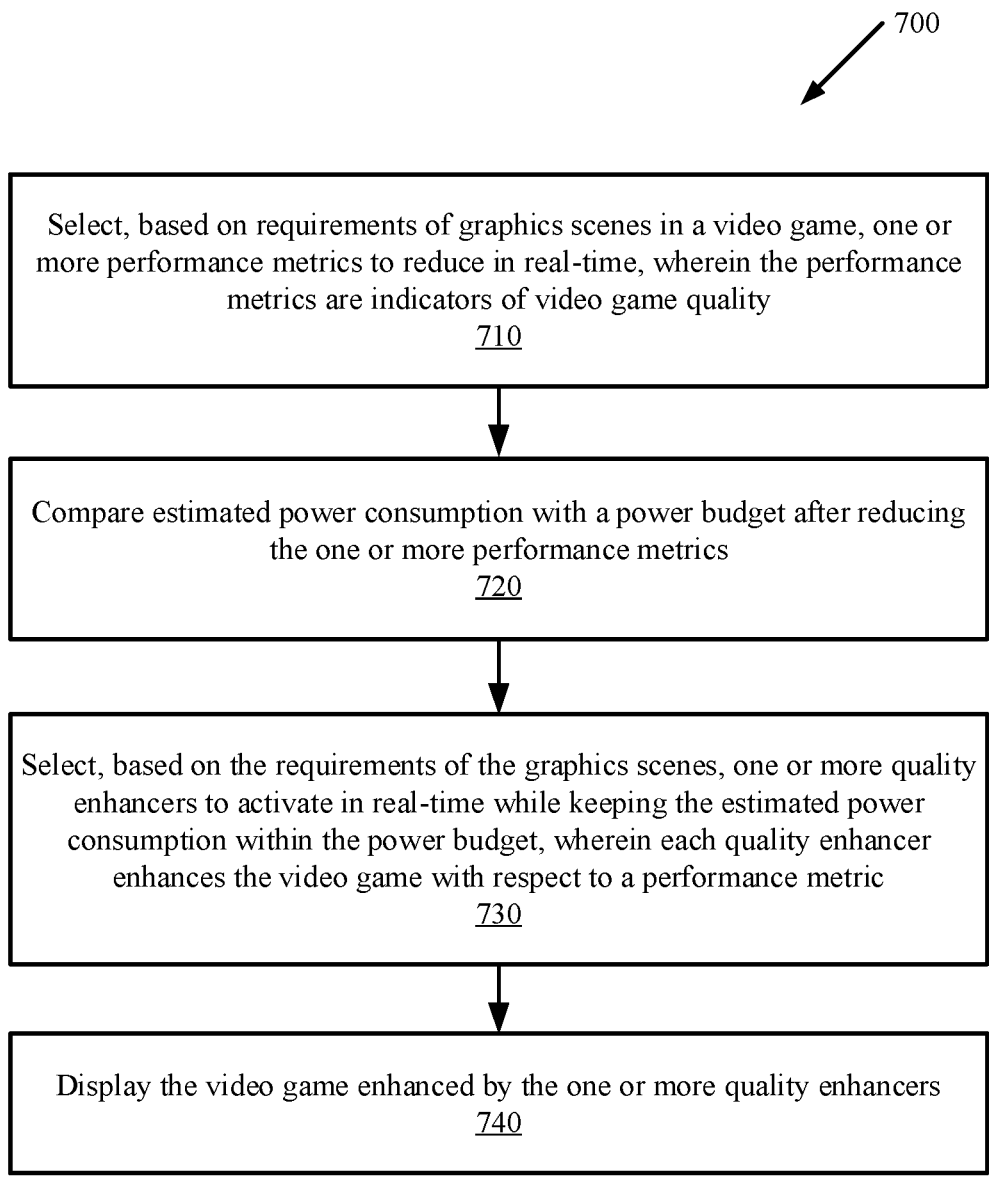
FIG. 7 is a flow diagram illustrating a method for balanced power management according to one embodiment.

FIG. 7 is a flow diagram illustrating a method 700 for balanced power management according to one embodiment. In one embodiment, method 700 may be performed by a system such as computing system 100 in FIG. 1 and/or a device 800 in FIG. 8. The system includes at least a processor that renders a video game including a sequence of graphics scenes.

Method 700 starts with step 710 when the system (more specifically, a balance manager such as balance manager 160 in FIG. 1) selects one or more performance metrics to reduce in real-time. The selection may be based on requirements of the graphics scenes in a video game. At step 720, the balance manager compares estimated power consumption with a power budget after reducing the one or more performance metrics. At step 730, the balance manager selects, based on the requirements of the graphics scenes, one or more quality enhancers to activate in real-time while keeping the estimated power consumption within the power budget. Each quality enhancer enhances the video game with respect to a performance metric. At step 740, the system displays the video game enhanced by the one or more quality enhancers.

In one embodiment, the performance metrics provided by the computing system include at least resolution, frame rate, and picture quality of the video game. The quality enhancers provided by the computing system include one or more of: an AI SR engine to enhance resolution, and an MEMC engine to increase frame rate, and a PQ engine to increase a picture quality level. In one embodiment, the requirements of graphics scenes include priorities of the performance metrics provided by the computing system.

In one embodiment, the balance manager selects the one or more performance metrics based on the present loading of each processor and the predicted loading of each processor with the one or more performance metrics reduced. In one embodiment, the balance manager selects the one or more quality enhancers based on the present loading of each processor and the predicted loading of each processor with the one or more quality enhancers activated.

In one embodiment, based on one or more power models, the balance manager predicts power consumption of the computing system with the one or more quality enhancers activated. The balance manager activates the one or more quality enhancers when the predicted power consumption is within the power budget.

In one embodiment, the power budget is dynamically adjusted based on temperatures sensed in the computing system. The balance manager determines which quality enhances to turn on or off based on the adjusted power budget and the estimated power consumption. In one embodiment, after reducing the one or more performance metrics, the operating frequency of one or more processors is dynamically lowered to further reduce power consumption to within the power budget. In one embodiment, if the estimated power consumption exceeds the power budget after reducing FPS and resolution of the video game, the computing system performs variable-rate shading (VRS) on the video game.

In one embodiment, the balance manager selects a combination of performance metrics to adjust when there is a power budget surplus. Based on at least the requirements of the graphics scenes, the balance manager determines which quality enhancers to turn on or off without exceeding the power budget. In one embodiment, the balance manager selects a combination of performance metrics to adjust and quality enhancers to turn on or off based on a whitelist that is set up for each graphics scene and each function used in rendering the graphics scene.

Figure 8:
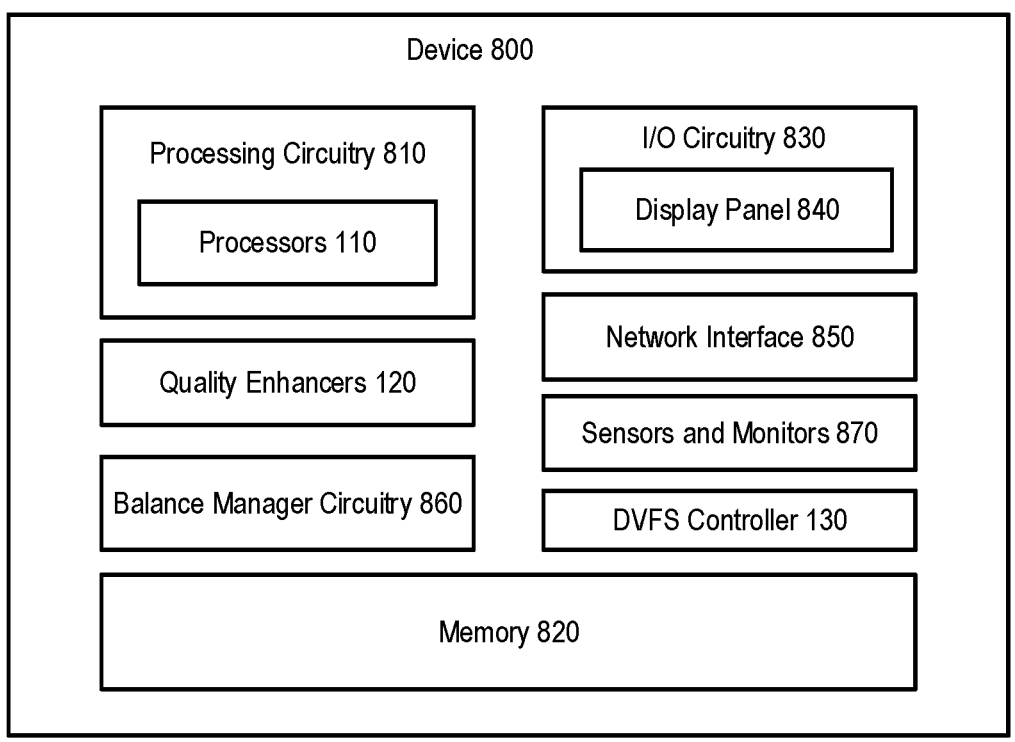
FIG. 8 is a block diagram illustrating a device operative to perform balanced power management according to one embodiment.

FIG. 8 illustrates an example of a device 800 operative to perform balanced power management according to one embodiment. Device 800 may be embodied in many form factors, such as a computer system, a gaming device, a smartphone, a mobile device, a handheld device, a wearable device, an entertainment system, and the like. Device 800 may be an example of computing system 100 in FIG. 1. Device 800 includes processing circuitry 810, memory 820, I/O circuitry 830, a network interface 850, balance manager circuitry 860, and sensors and monitors 870 (e.g., temperature sensors and load monitor). Balance manager circuitry 860 is an example of balance manager 160 in FIG. 1. I/O circuitry 830 further includes a display panel 840 to display information such as images, video games, etc. It is understood that system 800 is simplified for illustration; additional hardware and software components are not shown. Processing circuitry 810 includes processors 110, such as a CPU, a GPU, an APU, a deep learning accelerator (DLA), a digital signal processor (DSP), a multimedia processor, other general-purpose and/or special-purpose processing circuitry. Device 800 further includes quality enhancers 120 and DVFS controller 130 shown and described in connection with FIG. 1.

Memory 820 may include a dynamic random access memory (DRAM) device, a static RAM (SRAM) device, a flash memory device, and/or other volatile or non-volatile memory devices. In one embodiment, memory 820 stores multiple power models (e.g., power models 165 in FIG. 1) used by balance manager circuitry 860 to determine the amount of power consumption under different scenarios.

The operations of the flow diagrams of FIG. 2, FIG. 3, and FIG. 7 have been described with reference to the exemplary embodiments of FIG. 1 and FIG. 8. However, it should be understood that the operations of the flow diagrams of FIG. 2, FIG. 3, and FIG. 7 can be performed by embodiments of the invention other than the embodiments of FIG. 1 and FIG. 8, and the embodiments of FIG. 1 and FIG. 8 can perform operations different than those discussed with reference to the flow diagrams. While the flow diagrams of FIG. 2, FIG. 3, and FIG. 7 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for balanced power management in a computing system, comprising:
   selecting, based on requirements of graphics scenes in a video game, one or more performance metrics to reduce in real-time, wherein the performance metrics are indicators of video game quality;
   comparing estimated power consumption with a power budget after reducing the one or more performance metrics;
   selecting, based on the requirements of the graphics scenes, one or more quality enhancers to activate in real-time while keeping the estimated power consumption within the power budget, wherein each quality enhancer enhances the video game with respect to a performance metric, and wherein the selecting further comprises:
      predicting, based on one or more power models, power consumption of the computing system with the one or more quality enhancers activated; and
      activating the one or more quality enhancers when predicted power consumption is within the power budget; and
   displaying the video game enhanced by the one or more quality enhancers.

2. The method of claim 1, wherein the performance metrics provided by the computing system include at least resolution, frame rate, and picture quality of the video game.

3. The method of claim 1, wherein the quality enhancers provided by the computing system include one or more of: an artificial intelligence (AI) super-resolution (SR) engine to enhance resolution, and a motion estimation motion compensation (MEMC) engine to increase frame rate, and a picture quality (PQ) engine to increase a picture quality level.

4. The method of claim 1, wherein the requirements of graphics scenes include priorities of the performance metrics provided by the computing system.

5. The method of claim 1, wherein selecting the one or more performance metrics is based on present loading of each of a plurality of processors in the computing system and predicted loading of each processor with the one or more performance metrics reduced.

6. The method of claim 1, wherein selecting the one or more quality enhancers is based on present loading of each of a plurality of processors in the computing system and predicted loading of each processor with the one or more quality enhancers activated.

7. The method of claim 1, further comprising:
dynamically adjusting the power budget based on temperatures sensed in the computing system; and
determining which quality enhances to turn on or off based on the adjusted power budget and the estimated power consumption.

8. The method of claim 1, further comprising:
after reducing the one or more performance metrics, dynamically lowering operating frequency of one or more processors in the computing system to reduce power consumption to within the power budget.

9. The method of claim 1, further comprising:
if the estimated power consumption exceeds the power budget after reducing frame per second (FPS) and resolution of the video game, performing variable-rate shading (VRS) on the video game.

10. The method of claim 1, further comprising:
selecting a combination of performance metrics to adjust when there is a power budget surplus; and
based on at least the requirements of the graphics scenes, determining which quality enhancers to turn on or off without exceeding the power budget.

11. The method of claim 1, further comprising:
selecting a combination of performance metrics to adjust and quality enhancers to turn on or off based on a whitelist that is set up for each graphics scene and each of a plurality of functions used in rendering the graphics scene.

12. A system operative to perform balanced power management, comprising:
a plurality of processors;
balance manager circuitry coupled to the processors to:
select, based on requirements of graphics scenes in a video game, one or more performance metrics to reduce in real-time, wherein the performance metrics are indicators of video game quality;
compare estimated power consumption with a power budget after reduction of the one or more performance metrics; and
select, based on the requirements of the graphics scenes, one or more quality enhancers to activate in real-time, wherein each quality enhancer enhances the video game with respect to a performance metric, and wherein when selecting the one or more quality enhancers, the balance manager circuitry is further operative to;
predict, based on one or more power models, power consumption of the computing system with the one or more quality enhancers activated; and
activating the one or more quality enhancers when predicted power consumption is within the power budget; and
a display to display the video game enhanced by the one or more quality enhancers.

13. The system of claim 12, wherein the performance metrics provided by the system include at least resolution, frame rate, and picture quality of the video game.

14. The system of claim 12, wherein the quality enhancers provided by the system include one or more of: an artificial intelligence (AI) super-resolution (SR) engine to enhance resolution, and a motion estimation motion compensation (MEMC) engine to increase frame rate, and a picture quality (PQ) engine to increase a picture quality level.

15. The system of claim 12, wherein the requirements of graphics scenes include priorities of the performance metrics provided by the system.

16. The system of claim 12, wherein the balance manager circuitry is operative to select the one or more quality enhancers based on present loading of each processor and predicted loading of each processor with the one or more quality enhancers activated.

17. The system of claim 12, wherein the balance manager circuitry is operative to perform variable-rate shading (VRS) on the video game if the estimated power consumption exceeds the power budget after reducing frame per second (FPS) and resolution of the video game.

18. The system of claim 12, wherein the balance manager circuitry is operative to:
select a combination of performance metrics to adjust when there is a power budget surplus; and
based on at least the requirements of the graphics scenes, determine which quality enhancers to turn on or off without exceeding the power budget.

* * * * *